United States Patent
Hwang et al.

(10) Patent No.: US 10,434,862 B2
(45) Date of Patent: Oct. 8, 2019

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Seongwook Ji, Gunpo-si (KR); Ki Tae Kim, Incheon (KR); Ki Dong Kim, Anyang-si (KR); Hyun Sik Kwon, Seoul (KR); Cheol Ho Jang, Busan (KR); Soonki Eo, Ansan-si (KR); Kijong Park, Hwaseong-si (KR); Wonmin Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 44 days.

(21) Appl. No.: 15/833,983

(22) Filed: Dec. 6, 2017

(65) Prior Publication Data

US 2019/0118635 A1    Apr. 25, 2019

(30) Foreign Application Priority Data

Oct. 25, 2017  (KR) .................. 10-2017-0139147

(51) Int. Cl.
*F16H 3/54*    (2006.01)
*B60K 6/365*   (2007.10)
(Continued)

(52) U.S. Cl.
CPC ............. *B60K 6/365* (2013.01); *B60K 6/48* (2013.01); *F16H 3/006* (2013.01); *F16H 3/0915* (2013.01);
(Continued)

(58) Field of Classification Search
CPC ........ F16H 37/065; F16H 37/046; F16H 3/54; F16H 3/0915; F16H 3/006;
(Continued)

(56) References Cited

U.S. PATENT DOCUMENTS 10,023,042 B2 *   7/2018  Cho ................. B60K 6/547
2017/0159779 A1 * 6/2017  Hwang ............. F16H 37/042
(Continued)

FOREIGN PATENT DOCUMENTS

DE    102008031456 A1 *  1/2010  ............... B60K 6/36

*Primary Examiner* — Roger L Pang
(74) *Attorney, Agent, or Firm* — Knobbe Martens Olson & Bear LLP

(57) ABSTRACT

A power transmission apparatus for a vehicle is disclosed. The power transmission apparatus includes three concentric input shafts, input shaft fixedly connected to an engine output shaft, a transmitting shaft disposed on the outer circumference of the first input shaft without rotation interference, a central shaft parallel to a first one of the input shafts and spaced apart from the first input shaft by a predetermined interval, a fixed transmission selectively shifting an input torque depending on the respective gear ratios of four change gear trains disposed between first and second input shafts, the transmitting shaft, and the central shaft and each having drive gears and driven gears externally connected to each other and outputting the shifted torque through the central shaft and the transmitting shaft, and composite transmission including a planetary gear set having a sun gear fixedly connected to one side of the transmitting shaft.

16 Claims, 14 Drawing Sheets

(51) Int. Cl.
*F16H 3/00* (2006.01)
*F16H 3/091* (2006.01)
*F16H 37/04* (2006.01)
*F16H 37/06* (2006.01)
*B60K 6/48* (2007.10)

(52) U.S. Cl.
CPC ............. *F16H 3/54* (2013.01); *F16H 37/046* (2013.01); *F16H 37/065* (2013.01); *B60Y 2200/92* (2013.01); *F16H 2003/007* (2013.01); *F16H 2200/006* (2013.01); *F16H 2200/0065* (2013.01); *F16H 2200/2005* (2013.01); *F16H 2200/2033* (2013.01); *Y10S 903/91* (2013.01)

(58) Field of Classification Search
CPC ....... F16H 2200/006; F16H 2200/2033; F16H 2003/007; F16H 2200/2005
USPC ............................ 475/207, 218, 903; 74/330
See application file for complete search history.

(56) References Cited

U.S. PATENT DOCUMENTS

2018/0163833 A1* 6/2018 Hwang
2019/0120342 A1* 4/2019 Hwang ..................... F16H 3/78

* cited by examiner

FIG. 2

| SHIFT STAGE | CL1 | CL2 | CL3 | CL4 | SL1 |   |   | SL2 |   |   |
|---|---|---|---|---|---|---|---|---|---|---|
|   |   |   |   |   | D1 | N | D2 | D4 | N | D3 |
| REV | ● |   |   | ● |   | ● |   |   |   | ● |
| FD1 | ● | ● |   | ● |   |   |   |   | ● |   |
| FD2 |   |   |   | ● | ● |   |   |   |   |   |
| FD3 |   | ● |   | ● |   | ● |   |   |   |   |
| FD4 |   |   | ● | ● | ● |   | ● | ● |   |   |
| FD5 |   | ● | ● |   |   |   | ● |   |   |   |
| FD6 | ● |   | ● |   |   | ● |   | ● |   |   |
| FD7 |   | ● | ● |   | ● |   |   |   | ● |   |
| FD8 | ● |   | ● |   |   | ● |   |   |   | ● |

FIG. 4

| | SHIFT STAGE | ECL | CL1 | CL2 | CL3 | CL4 | SL1 | | | SL2 | | |
|---|---|---|---|---|---|---|---|---|---|---|---|---|
| | | | | | | | D1 | N | D2 | D4 | N | D3 |
| ENGINE MODE / PARALLEL MODE | REV | ● | ● | | | ● | | ● | | | | ● |
| | FD1 | ● | | ● | | ● | ● | | | | ● | |
| | FD2 | ● | ● | | | ● | | ● | | ● | | |
| | FD3 | ● | | ● | | ● | | | ● | | ● | |
| | FD4 | ● | | | ● | ● | ● | | | ● | | |
| | FD5 | ● | | ● | ● | | | | ● | | ● | |
| | FD6 | ● | ● | | ● | | | ● | | ● | | |
| | FD7 | ● | | ● | ● | | ● | | | | ● | |
| | FD8 | ● | ● | | ● | | | ● | | | | ● |
| EV MODE | REV | | ● | | | ● | | ● | | | | ● |
| | FD1 | | | ● | | ● | ● | | | | ● | |
| | FD2 | | ● | | | ● | | ● | | ● | | |
| | FD3 | | | ● | | ● | | | ● | | ● | |
| | FD4 | | | | ● | ● | ● | | | ● | | |
| | FD5 | | | ● | ● | | | | ● | | ● | |
| | FD6 | | ● | | ● | | | ● | | ● | | |
| | FD7 | | | ● | ● | | ● | | | | ● | |
| | FD8 | | ● | | ● | | | ● | | | | ● |

FIG. 7

| SHIFT STAGE | MG | CL1 | CL2 | CL3 | CL4 | SL1 | | | SL2 | | | |
|---|---|---|---|---|---|---|---|---|---|---|---|---|
| | | | | | | D1 | N | D2 | D4 | N | D3 | |
| REV | ○ | ● | | | ● | | ● | | | | | ● |
| FD1 | ○ | | ● | | ● | ● | | | | | ● | |
| FD2 | ○ | ● | | | ● | | ● | | | ● | | |
| FD3 | ○ | | ● | | ● | | | ● | | | ● | |
| FD4 | ○ | | | ● | ● | ● | | | ● | | | |
| FD5 | ○ | | ● | ● | | | | ● | | | ● | |
| FD6 | ○ | ● | ● | ● | | | | | ● | | | |
| FD7 | ○ | ● | | ● | | ● | | | | | ● | |
| FD8 | ○ | | | ● | | | ● | | | | | ● |
| REV | ● | | | | ● | | ● | | | ● | | |
| FD | ● | | | | ● | | ● | | | ● | | |
| FD | ● | | | ● | | | ● | | | ● | | |

Modes: REV–FD8: ENGINE MODE / PARALLEL MODE; REV, FD: EV MODE; FD: e-CVT MODE

FIG. 9

| SHIFT STAGE | CL1 | CL2 | CL3 | CL4 | BK | SL1 | | | SL2 | | |
|---|---|---|---|---|---|---|---|---|---|---|---|
| | | | | | | D1 | N | D2 | D4 | N | D3 |
| REV | ● | | | ● | | | ● | | | | ● |
| FD1 | | ● | | ● | | ● | | | | ● | |
| FD2 | ● | | | ● | | | ● | | ● | | |
| FD3 | | ● | | ● | | ● | | ● | | ● | |
| FD4 | | | ● | ● | | | | ● | ● | | |
| FD5 | | ● | ● | | | ● | | | ● | | |
| FD6 | ● | | ● | | | | ● | | | ● | |
| FD7 | | ● | ● | | | ● | | | | ● | |
| FD8 | | | ● | | ● | | ● | | | ● | |
| FD9 | ● | | ● | | | | ● | | | | ● |

FIG. 11

| | SHIFT STAGE | ECL | CL1 | CL2 | CL3 | CL4 | BK | SL1 | | | SL2 | | |
|---|---|---|---|---|---|---|---|---|---|---|---|---|---|
| | | | | | | | | D1 | N | D2 | D4 | N | D3 |
| ENGINE MODE / PARALLEL MODE | REV | ● | ● | | | ● | | ● | | | | | ● |
| | FD1 | ● | | ● | | ● | | ● | | | | ● | |
| | FD2 | ● | ● | | | ● | | | ● | | ● | | |
| | FD3 | ● | | ● | | ● | | | | ● | ● | | |
| | FD4 | ● | | | ● | ● | | ● | | | ● | | |
| | FD5 | ● | | ● | ● | | | | | ● | ● | | |
| | FD6 | ● | ● | | ● | | | | ● | | ● | | |
| | FD7 | ● | | ● | ● | | | ● | | | | ● | |
| | FD8 | ● | | | ● | | ● | ● | | | | ● | |
| | FD9 | ● | ● | | ● | | | | ● | | | | ● |
| EV MODE | REV | | ● | | | ● | | ● | | | | | ● |
| | FD1 | | | ● | | ● | | ● | | | | ● | |
| | FD2 | | ● | | | ● | | | ● | | ● | | |
| | FD3 | | | ● | | ● | | | | ● | ● | | |
| | FD4 | | | | ● | ● | | ● | | | ● | | |
| | FD5 | | | ● | ● | | | | | ● | ● | | |
| | FD6 | | ● | | ● | | | | ● | | ● | | |
| | FD7 | | | ● | ● | | | ● | | | | ● | |
| | FD8 | | | | ● | | ● | ● | | | | ● | |
| | FD9 | | ● | | ● | | | | ● | | | | ● |

FIG. 14

| SHIFT STAGE | | ECL | CL1 | CL2 | CL3 | CL4 | BK | SL1 | | | SL2 | | |
|---|---|---|---|---|---|---|---|---|---|---|---|---|---|
| | | | | | | | | D1 | N | D2 | D4 | N | D3 |
| ENGINE MODE / PARALLEL MODE | REV | ○ | ● | | | ● | | | ● | | | | ● |
| | FD1 | ○ | | ● | | ● | | ● | | | | ● | |
| | FD2 | ○ | ● | | | ● | | | ● | | ● | | |
| | FD3 | ○ | | ● | | ● | | | | ● | | ● | |
| | FD4 | ○ | | | ● | ● | | ● | | | ● | | |
| | FD5 | ○ | ● | ● | ● | | | | | ● | | ● | |
| | FD6 | ○ | | | ● | | | | ● | | ● | | |
| | FD7 | ○ | | ● | ● | | | ● | | | | ● | |
| | FD8 | ○ | ● | | ● | | ● | | ● | | | ● | |
| | FD9 | ○ | | | ● | | | | ● | | | | ● |
| EV MODE | REV | ● | | | | ● | | | ● | | | ● | |
| | FD | ● | | | | ● | | | ● | | | ● | |
| e-CVT MODE | FD | ● | | | ● | | | | ● | | | ● | |

POWER TRANSMISSION APPARATUS FOR VEHICLE

CROSS-REFERENCE TO RELATED APPLICATION

This application claims priority to and the benefit of Korean Patent Application No. 10-2017-0139147 filed in the Korean Intellectual Property Office on Oct. 25, 2017, the entire contents of which are incorporated herein by reference.

BACKGROUND (a) Field

The present disclosure relates to a power transmission apparatus for a vehicle. More particularly, the present disclosure relates to a power transmission apparatus for a vehicle capable of implementing multiple fixed shift stages using one planetary gear set and one or more synchronizers in a dual clutch transmission (DCT) and enabling driving in an electric vehicle (EV) mode and a parallel hybrid mode by additionally disposing one motor/generator.

(b) Description of Related Art

Environmentally-friendly technology in a vehicle is a key to survival for the future vehicle industry, and automakers have made every effort to develop environmentally-friendly vehicles for accomplishing environment and fuel consumption regulations.

An example of the future vehicle technology may include an electric vehicle (EV) and a hybrid electric vehicle (HEV) that use electric energy and a dual clutch transmission (DCT) that has improved efficiency and convenience.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

A DCT includes two clutch devices in an automatic transmission and a gear train of a basic manual transmission, selectively transfers a torque input from an engine to two input shafts using two clutches, shifts the torque using the gear train described above, and outputs the shifted torque.

The DCT has been attempted in order to compactly implement a high shift stage transmission of 5 shift stages or more, and has been implemented as an auto manual transmission (AMT) that makes a manual shift of a driver unnecessary by controlling the two clutches and synchronizing devices by a controller.

Therefore, since the DCT may comply with importance of implementation efficiency of more shift stages and a fuel consumption regulation due to advantages such as power transfer efficiency more excellent than that of a planetary gear-type automatic transmission and easiness of replacement and addition of components depending on implementation of more shift stages, the DCT has been prominent.

The present disclosure has been made in an effort to provide a power transmission apparatus for a vehicle having advantages of simplifying an internal configuration through a reduction in the number of components, improving fuel consumption through minimization of a weight, and improving mountability through a reduction in a volume by implementing multiple fixed shift stages using one planetary gear set and one or more synchronizers in a dual clutch transmission.

Further, the present disclosure has been made in an effort to provide a power transmission apparatus for a vehicle having advantages of improving fuel consumption by additionally disposing one motor/generator to enable driving in an electric vehicle (EV) mode and a parallel hybrid mode.

An embodiment of the present invention provides a power transmission apparatus for a vehicle, including: a first input shaft fixedly connected to an engine output shaft; a second input shaft formed of a hollow shaft, disposed on an outer circumference of the first input shaft without rotation interference so as to overlap the first input shaft, and selectively connected to the engine output shaft through a first clutch; a third input shaft formed of a hollow shaft, disposed on an outer circumference of the second input shaft without rotation interference so as to overlap the second input shaft, and selectively connected to the engine output shaft through a second clutch; a transmitting shaft disposed on the outer circumference of the first input shaft without rotation interference so as to correspond to a rear side of the second input shaft; a central shaft disposed in parallel with the first input shaft in a state in which the central shaft is spaced apart from the first input shaft by a predetermined interval; a fixed transmission selectively shifting an input torque depending on the respective gear ratios of four change gear trains disposed between the first and second input shafts, the transmitting shaft, and the central shaft and each having drive gears and driven gears externally connected to each other and outputting the shifted torque through the central shaft and the transmitting shaft; a composite transmission including a planetary gear set having a sun gear fixedly connected to one side of the transmitting shaft, a planetary carrier selectively connected to the first input shaft through a third clutch, and a ring gear connected integrally with an output gear so as to be selectively connected to the central shaft to complementarily compositely shift input torques and output the shifted torque; and an output shaft disposed on the same shaft line as that of the first input shaft behind the first input shaft and fixedly connected to the output gear of the composite transmission.

The first and second clutches, the fixed transmission, and the composite transmission may be disposed in a sequence of the first and second clutches, the fixed transmission, and the composite transmission behind the engine.

The four change gear trains may include: a first change gear train including a first drive gear disposed on an outer circumference of the third input shaft without rotation interference and a first driven gear fixedly connected to the central shaft and externally connected to the first drive gear; a second change gear train including a second drive gear disposed on the outer circumference of the third input shaft without rotation interference and a second driven gear fixedly connected to the central shaft and externally connected to the second drive gear; a third change gear train including a third drive gear disposed on the outer circumference of the second input shaft without rotation interference, a third driven gear fixedly connected to the central shaft, and an idle gear externally connected to the third drive gear and the third driven gear; and a first change gear train including a fourth drive gear fixedly connected to the transmitting shaft and a fourth driven gear fixedly connected to the central shaft and externally connected to the fourth drive gear.

The first drive gear and the second drive gear may be selectively synchronously connected to the third input shaft by a first synchronizer, and the third drive gear and the fourth drive gear may be selectively synchronously connected to the second input shaft by a second synchronizer.

The first change gear train may have a gear ratio for forward 1-speed and 7-speed, the second change gear train may have a gear ratio for forward 3-speed and 5-speed, the third change gear train may have a gear ratio for forward 8-speed and reverse, and the fourth change gear train may have a gear ratio for forward 2-speed and 6-speed.

In the composite transmission, the sun gear of the planetary gear set may be fixedly connected to the transmitting shaft, the planetary carrier of the planetary gear set may be selectively connected to the first input shaft, and the ring gear of the planetary gear set may be fixedly connected to the output gear connected to the output shaft, and the output gear may be externally connected to a central drive gear disposed on the central shaft without rotation interference and selectively connected to the central shaft through a fourth clutch.

The composite transmission may output a torque selectively transferred through the central drive gear on the central shaft to the output shaft through the output gear formed integrally with the ring gear as it is, and may complementarily compositely shift a torque selectively input from the first input shaft to the planetary carrier and the torque shifted from the fixed transmission and input to the sun gear through the transmitting shaft and output the shifted torque to the output shaft through the output gear.

The planetary gear set may be a single pinion planetary gear set.

The power transmission apparatus for a vehicle may further include a motor/generator connected to the first input shaft in series, selectively connected to the engine output shaft through an engine clutch, and selectively connected to the second and third input shafts through the first and second clutches, respectively.

The power transmission apparatus for a vehicle may further include a motor/generator disposed in parallel with the first input shaft and having a motor drive gear externally connected to a drive gear fixedly connected to the transmitting shaft.

The power transmission apparatus for a vehicle may further include a motor/generator disposed on the same shaft line as that of the central shaft and fixedly connected to the central shaft.

The transmitting shaft may be selectively connected to a transmission housing through a brake.

The first change gear train may have a gear ratio for forward 1-speed and 7-speed, the second change gear train may have a gear ratio for forward 3-speed and 5-speed, the third change gear train may have a gear ratio for forward 9-speed and reverse, and the fourth change gear train may have a gear ratio for forward 2-speed and 6-speed.

In the power transmission apparatus for a vehicle according to a first embodiment of the present invention, the fixed shift stages of forward eight speeds and reverse one speed may be implemented by adding one planetary gear set to a DCT structure that uses two synchronizers to realize more shift stages while simplifying an internal configuration and minimize a weight to improve mountability and fuel consumption.

In addition, in the power transmission apparatus for a vehicle according to a second embodiment of the present invention, as compared with the first embodiment, one motor/generator is disposed in series with the engine behind the engine to enable the driving in the engine mode, the parallel hybrid mode, and the EV mode in multiple fixed shift stages, thereby making it possible to improve fuel consumption.

In addition, in the power transmission apparatus for a vehicle according to a third embodiment of the present invention, as compared with the first embodiment, one motor/generator is disposed in parallel with the first input shaft, and the torque of the motor/generator is transferred to one rotation element of the planetary gear set to enable the driving in the engine mode and the parallel hybrid mode in multiple fixed shift stages and enable the driving in the electronic continuously variable automatic transmission (e-CVT) mode and the EV mode as needed, thereby making it possible to improve fuel consumption.

In addition, in the power transmission apparatus for a vehicle according to a fourth embodiment of the present invention, as compared with the first embodiment, one motor/generator is fixedly connected to the central shaft on the same shaft line as that of the central shaft to allow the torque of the motor/generator to be transferred to one rotation element of the planetary gear set to enable the driving in the engine mode and the parallel hybrid mode in multiple fixed shift stages and enable the driving in the e-CVT mode and the EV mode as needed, thereby making it possible to improve fuel consumption.

In addition, in the power transmission apparatus for a vehicle according to a fifth embodiment of the present invention, one planetary gear set is added to the DCT structure that uses two synchronizers to allow one of three rotation elements of the planetary gear set to be operated as a selective fixed element as compared with the first embodiment that may implement the fixed shift stages of forward eight speeds and reverse one speed, such that the fixed shift stages of forward nine speeds and reverse one speed may be implemented to realize more shift stages while simplifying an internal configuration and minimize a weight to improve mountability and fuel consumption.

In addition, in the power transmission apparatus for a vehicle according to a sixth embodiment of the present invention, as compared with the fifth embodiment, one motor/generator is disposed in series with the engine behind the engine to enable the driving in the engine mode, the parallel hybrid mode, and the EV mode in multiple fixed shift stages, thereby making it possible to improve fuel consumption.

In addition, in the power transmission apparatus for a vehicle according to a seventh embodiment of the present invention, as compared with the fifth embodiment, one motor/generator is disposed in parallel with the first input shaft, and the torque of the motor/generator is transferred to one rotation element of the planetary gear set that may be operated as a selective fixed element together with the central shaft to enable the driving in the engine mode and the parallel hybrid mode in multiple fixed shift stages and enable the driving in the e-CVT mode and the EV mode as needed, thereby making it possible to improve fuel consumption.

In addition, in the power transmission apparatus for a vehicle according to an eighth embodiment of the present invention, as compared with the fifth embodiment, one motor/generator is fixedly connected to the central shaft on the same shaft line as that of the central shaft to allow the torque of the motor/generator to be transferred to one rotation element of the planetary gear set that may be operated as a selective fixed element together with the central shaft to enable the driving in the engine mode and the parallel hybrid mode in multiple fixed shift stages and enable the driving in the e-CVT mode and the EV mode as needed, thereby making it possible to improve fuel consumption.

In addition, in embodiments of the present invention, when a shift is performed, three clutches alternately perform the shifts to odd shift stages and even shift stages, thereby making it possible to natural perform the shift without generating a shift disconnection sense.

Other effects that may be obtained or are predicted by an embodiment of the present invention will be explicitly or implicitly described in a detailed description of the present invention. That is, various effects that are predicted according to an embodiment of the present invention will be described in the following detailed description.

BRIEF DESCRIPTION OF THE DRAWINGS

FIG. 2 is a shift operation table of the power transmission apparatus for a vehicle according to a first embodiment of the present invention.

FIG. 4 is a shift operation table of the power transmission apparatus for a vehicle according to a second embodiment of the present invention.

FIG. 7 is a shift operation table of the power transmission apparatuses for a vehicle according to the third and fourth embodiments of the present invention.

FIG. 9 is a shift operation table of the power transmission apparatus for a vehicle according to a fifth embodiment of the present invention.

FIG. 11 is a shift operation table of the power transmission apparatus for a vehicle according to a sixth embodiment of the present invention.

FIG. 14 is a shift operation table of the power transmission apparatuses for a vehicle according to the seventh and eighth embodiments of the present invention.

DETAILED DESCRIPTION

Figure 1:
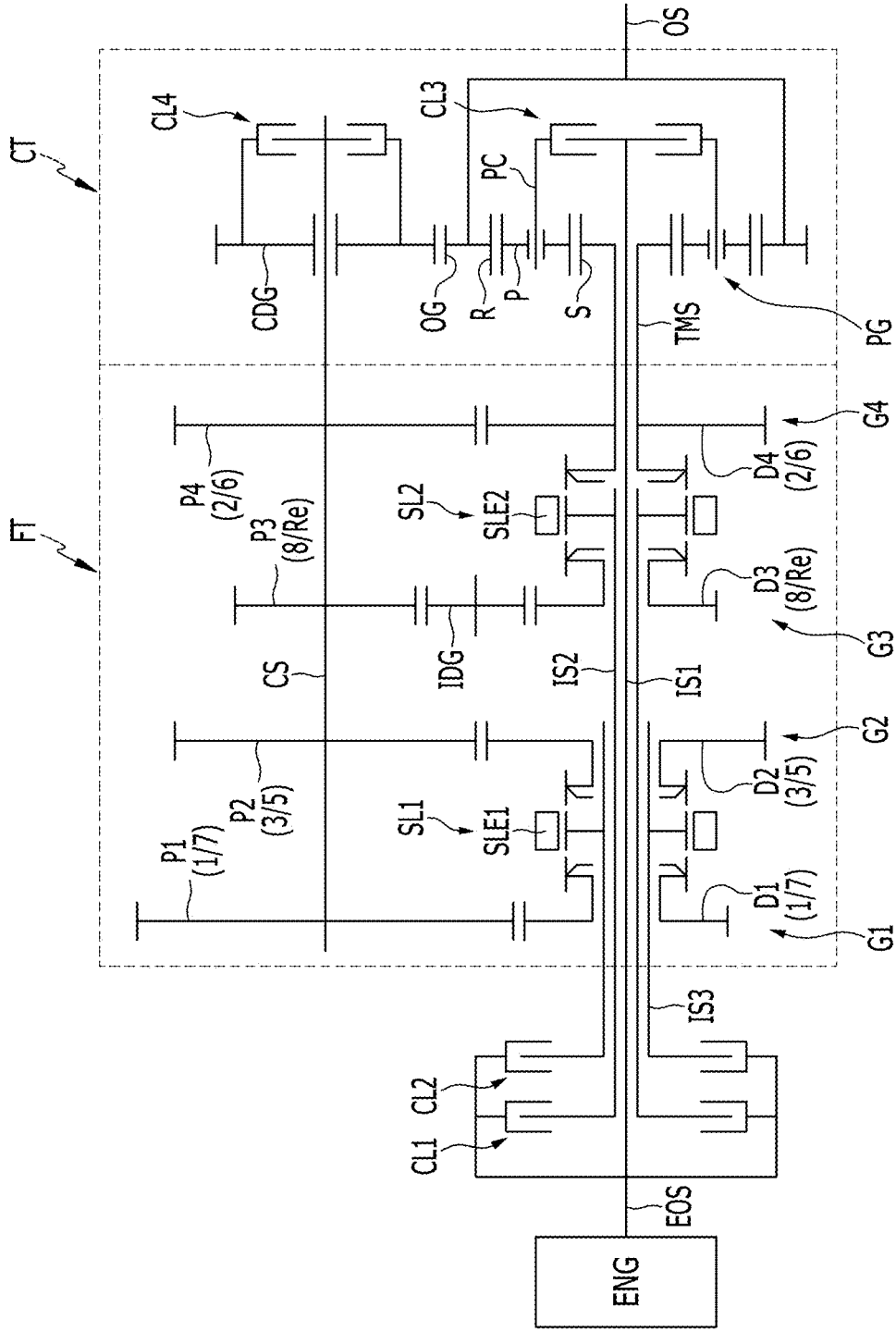
FIG. 1 is a configuration diagram of a power transmission apparatus for a vehicle according to a first embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Portions unrelated to the description will be omitted to obviously describe the present invention, and similar reference numerals will be used to describe the same or similar portions throughout the specification.

In the following description, dividing names of components into first, second and the like is to divide the names because the names of the components are the same as each other and an order thereof is not particularly limited.

In embodiments, when two members (elements) are fixedly connected with a shaft, the two members move together and rotate about a rotational axis at the same angular speed. In embodiments, when a member is fixedly connected to a transmission housing, the member is fixed to the transmission housing and does not rotate about a rotational axis of the transmission. In embodiments, when two members are fixedly connected each other and when one of the two members is fixedly connected to a transmission housing, the two fixedly connected members are fixed to the transmission housing and do not rotate about a rotational axis of the transmission. In embodiments, the term "fixedly connected" is interchangeable with the term "fixed to".

In embodiments, when two members are "selectively connected", the two members are operable (1) to engage (fixedly connected) each other to move/rotate together for an operation of the transmission or (2) not to engage each other and to move independently for another operation of the transmission. In embodiment, the term "selectively connected" is interchangeable with the term "connect or disconnect". In embodiment, when a member engages with a transmission housing, the member is fixed to the transmission housing, and does not rotate about a rotational axis of a transmission.

In embodiments, when two members are "synchronously connected" using a synchronizer, the two members are operable to (1) rotate together at the same angular speed when the synchronizer operates to engage/synchronize the two members or (2) to rotate at two different angular speed when the synchronizer does not operate to engage/synchronize the two members.

In embodiments, when a clutch operates, the clutch engages two rotatable members (axes) corresponding to the clutch such that the members rotate together at the same angular speed.

FIG. 1 is a configuration diagram of a power transmission apparatus for a vehicle according to a first embodiment of the present invention.

Referring to FIG. 1, the power transmission apparatus for a vehicle according to a first embodiment of the present invention includes first, second, and third input shafts IS1, IS2, and IS3, a transmitting shaft TMS, a central shaft CS, a fixed transmission FT, a composite transmission CT, and an output shaft OS.

Therefore, when a torque of an engine ENG which is a power source is selectively input to the fixed transmission FT through first and second clutches CL1 and CL2, the torque is shifted to four fixed shift stages in the fixed transmission FT, and the torques are shifted in reduced and increased gear ratios by a complementary action between the shifted torque transferred from the fixed transmission FT and the torque selectively transferred from the engine ENG in the composite transmission CT and are then output through the output shaft OS, such that shift stages of forward eight speeds and reverse one speed are implemented.

As the engine ENG which is the power source, various known engines such as an existing gasoline engine, diesel engine, or the like, using a fossil fuel may be used.

The torque generated from the engine ENG is directly or selectively transferred to the first, second, and third input shaft IS1, IS2, and IS3, the torque transferred to the first, second, and third input shaft IS1, IS2, and IS3 is transferred to the fixed transmission FT and the composite transmission CT disposed on the first, second, third input shaft IS1, IS2, and IS3 and the central shaft CS disposed in parallel with the first, second, third input shaft IS1, IS2, and IS3 in a state in which it is spaced apart from the first, second, third input shaft IS1, IS2, and IS3 by a predetermined interval and is then shifted.

In addition, for the torque flow as described above, the first and second clutches CL1 and CL2, the fixed transmission FT, and the composite transmission CT are sequentially disposed behind the engine ENG.

The first input shaft IS1 is fixedly connected to an engine output shaft (EOS: crankshaft), and the first input shaft IS1 selectively transfers the torque of the engine ENG to the composite transmission CT through a third clutch CL3.

The second input shaft IS2 is formed of a hollow shaft, is disposed on an outer circumference of the first input shaft IS1 without rotation interference, and is selectively connected to the engine output shaft EOS through the first clutch CL1, and the second input shaft IS2 selectively transfers the torque of the engine ENG to the fixed transmission FT.

The third input shaft IS3 is formed of a hollow shaft, is disposed on an outer circumference of the second input shaft IS2 without rotation interference, and is selectively connected to the engine output shaft EOS through the second clutch CL2, and the third input shaft IS3 selectively transfers the torque of the engine ENG to the fixed transmission FT.

The transmitting shaft TMS is disposed on the outer circumference of the first input shaft IS1 without rotation interference so as to correspond to a rear side of the second input shaft IS2.

In addition, the central shaft CS is disposed in parallel with the first input shaft IS1 in a state in which it is spaced apart from the first input shaft IS1 by a predetermined interval.

A central drive gear CDG is disposed on the central shaft CS without rotation interference, and is selectively power-connected to the central shaft CS through a fourth clutch CL4.

The fixed transmission FT is configured to include first, second, third, and fourth change gear trains G1, G2, G3, and G4 disposed between the second and third input shafts IS2 and IS3 and the transmitting shaft TMS, and the central shaft CS.

The first change gear train G1 is configured to include a first drive gear D1 disposed on an outer circumference of the third input shaft IS3 without rotation interference and a first driven gear P1 fixedly connected to the central shaft CS and externally connected to the first drive gear D1.

The second change gear train G2 is configured to include a second drive gear D2 disposed on the outer circumference of the third input shaft IS3 without rotation interference and a second driven gear P2 fixedly connected to the central shaft CS and externally connected to the second drive gear D2.

Here, a first synchronizer SL1 is disposed between the first drive gear D1 and the second drive gear D2 to selectively synchronously connect the first drive gear D1 and the second drive gear D2 to the third input shaft IS3.

The third change gear train G3 is configured to include a third drive gear D3 disposed on the outer circumference of the second input shaft IS2 without rotation interference, a third driven gear P3 fixedly connected to the central shaft CS, and an idle gear IDG externally connected to the third drive gear D3 and the third driven gear P3.

The fourth change gear train G4 is configured to include a fourth drive gear D4 fixedly connected to the transmitting shaft TMS disposed on the outer circumference of the first input shaft IS1 without the rotation interference and a fourth driven gear P4 fixedly connected to the central shaft CS and externally connected to the fourth drive gear D4.

Here, a second synchronizer SL2 is disposed between the third drive gear D3 and the fourth drive gear D4 to selectively synchronously connect the third drive gear D3 and the fourth drive gear D4 to the second input shaft IS2.

The meaning that the fixed transmission FT is configured to include the four change gear trains G1, G2, G3, and G4 as described above is that four fixed shift stages may be implemented, and gear ratios for the respective drive gears and driven gears forming the four change gear trains G1, G2, G3, and G4 may be changed depending on a design condition of a transmission.

In a first embodiment of the present invention, a case in which the first change gear train G1 has a gear ratio for a shift of 1-speed and 7-speed, the second change gear train G2 has a gear ratio for a shift of 3-speed and 5-speed, the third change gear train G3 has a gear ratio for a shift of 8-speed and reverse, and the fourth change gear train G4 has a gear ratio for a shift of 2-speed and 6-speed is illustrated by way of example.

Therefore, the first and second change gear trains G1 and G2 receiving and shifting a torque of the third input shaft IS3 may implement odd shift stages of forward 1-speed, 3-speed, 5-speed, and 7-speed, and third and fourth change gear trains G3 and G4 receiving and shifting a torque of the second input shaft IS2 may implement even shift stages of forward 2-speed, 6-speed, and 8-speed and a revere shift stage.

Through the configuration as described above, in the fixed transmission FT, the torque shifted through the four change gear trains G1, G2, G3, and G4 is output to the composite transmission CT through two paths. Here, one of the two paths is a path through the central shaft CS, and the other of the two paths is a path through the fourth change gear train G4 and the transmitting shaft TMS.

Here, since the first and second synchronizers SL1 and SL2 are the known components, a detailed description therefor will be omitted, first and second sleeves SLE1 and SLE2 used in the first and second synchronizers SL1 and SL2 include separate actuators as known, and the actuators perform a shift while being controlled by a transmission control unit.

The composite transmission CT is configured to include one planetary gear set PG.

The planetary gear set PG, which is a single pinion planetary gear set, includes a sun gear S, a planetary carrier PC rotatably supporting a plurality of pinion gears P externally connected to the sun gear S, and a ring gear internally connected to the plurality of pinion gears P.

The sun gear S is disposed on the outer circumference of the first input shaft IS1 without the rotation interference and is fixedly connected to the transmitting shaft TMS with which the fourth drive gear D4 is formed integrally, the planetary carrier PC is selectively connected to the first input shaft IS1 through the third clutch CL3, and the ring gear R, which is an output element, has an output gear OG integrally therewith on an outer circumference thereof.

The output ear OG is externally connected to the central drive gear CDG and is directly connected to the output shaft OS.

Here, the central drive gear CDG is disposed on an outer circumference of the central shaft CS without rotation interference, and the central drive gear CDG and the central shaft CS are selectively connected to each other through the fourth clutch CL4.

Through the configuration described above, the composite transmission CT may output the torque transferred from the central drive gear CDG of the central shaft CS to the output gear OG to the output shaft OS as it is.

In addition, in the composite transmission CT, in a state in which the torque is not input from the fixed transmission FT to the composite transmission CT, in the case in which the torque of the engine ENG is input to the composite transmission CT through the planetary carrier PC by an operation control of the third clutch CL3, such that the fourth clutch CL4 is controlled to be operated, the planetary gear set PG, the fourth change gear train G4, and the central shaft CS form one power transfer path having a closed circuit form, such that the torques may be complementarily operated and be compositely shifted depending on a gear ratio of the fourth change gear train G4 and a gear ratio between the central drive gear CDG and the output gear OG, and be then output.

In addition, in a state in which the torque of the engine ENG is input through the planetary carrier PC by an operation control of the third clutch CL3, the torque may be shifted and output by differential operations depending on rotation conditions (forward rotation, fixing, reverse rotation, and the like) of the sun gear.

Here, the first, second, third, and fourth clutches CL1, CL2, CL3, and CL4, which are friction mechanisms, are hydraulic friction coupling units operated by a hydraulic pressure supplied by a hydraulic control apparatus, and are mainly multi-plate wet hydraulic friction coupling units, but may be coupling units that may be operated depending on electrical signals supplied from an electronic control apparatus, such as a dog clutch, an electronic clutch, a magnetic clutch, and the like.

FIG. 2 is a shift operation table of the power transmission apparatus for a vehicle according to a first embodiment of the present invention, and shift processes will be described with reference to FIG. 2.

[Reverse]

In a reverse shift stage REV, as shown in FIG. 2, the third drive gear D3 and the second input shaft IS2 are synchronously connected to each other through the sleeve SLE2 of the second synchronizer SL2, and the first clutch CL1 and the fourth clutch CL4 are operated.

Therefore, the torque of the engine ENG is transferred to a differential apparatus through the first clutch CL1, the second input shaft IS2, the third drive gear D3, the idle gear IDG, the third driven gear P3, the central shaft CS, the fourth clutch CL4, the central drive gear CDG, the output gear OG, and the output shaft OS by the operation of the first clutch CL1, such that reverse driving is performed.

In this case, the composite transmission CT does not have influence on a reverse shift.

[Forward 1-Speed]

In forward 1-speed FD1, a shown in FIG. 2, the first drive gear D1 and third input shaft IS3 are synchronously connected to each other through the sleeve SLE1 of the first synchronizer SL1, and the second clutch CL2 and the fourth clutch CL4 are operated.

In embodiments, the second clutch CL2 operates to engage EOS and IS3 such that EOS and IS3 rotate together at the same angular speed.

Therefore, the torque of the engine ENG is transferred to the differential apparatus through the second clutch CL2, the third input shaft IS3, the first drive gear D1, the first driven gear P1, the central shaft CS, the fourth clutch CL4, the central drive gear CDG, the output gear OG, and the output shaft OS by the operation of the second clutch CL2, such that forward 1-speed driving is performed.

In this case, the composite transmission CT does not perform any operation on a forward 1-speed shift.

[Forward 2-Speed]

In forward 2-speed FD2, as shown in FIG. 2, the fourth drive gear D4 and the second input shaft IS2 are synchronously connected to each other through the sleeve SLE2 of the second synchronizer SL2, and the first clutch CL1 and the fourth clutch CL4 are operated.

Therefore, the torque of the engine ENG is transferred to the differential apparatus through the first clutch CL1, the second input shaft IS2, the fourth drive gear D4, the fourth driven gear P4, the central shaft CS, the fourth clutch CL4, the central drive gear CDG, the output gear OG, and the output shaft OS by the operation of the first clutch CL1, such that forward 2-speed driving is performed.

In this case, the composite transmission CT does not perform any operation on a forward 2-speed shift.

[Forward 3-Speed]

In forward 3-speed FD3, as shown in FIG. 2, the second driven gear P2 and the third input shaft IS3 are synchronously connected to each other through the sleeve SLE1 of the first synchronizer SL1, and the second clutch CL2 and the fourth clutch CL4 are operated.

Therefore, the torque of the engine ENG is transferred to the differential apparatus through the second clutch CL2, the third input shaft IS3, the second drive gear D2, the second driven gear P2, the central shaft CS, the fourth clutch CL4, the central drive gear CDG, the output gear OG, and the output shaft OS by the operation of the second clutch CL2, such that forward 3-speed driving is performed.

[Forward 4-Speed]

In forward 4-speed FD4, as shown in FIG. 2, the first drive gear D1 and third input shaft IS3 are synchronously connected to each other through the sleeve SLE1 of the first synchronizer SL1, the fourth drive gear D4 and the second input shaft IS2 are synchronously connected to each other through the sleeve SLE2 of the second synchronizer SL2, and the third clutch CL3 and the fourth clutch CL4 are operated.

Therefore, the fourth clutch CL4 is controlled to be operated in a state in which the torque of the engine ENG is input through the planetary carrier PC by the operation control of the third clutch CL3.

In this case, the planetary gear set PG, the fourth change gear train G4, and the central shaft CS form one power transfer path having a closed-circuit form, such that the torque is input through the planetary carrier PC of the planetary gear set PG. Therefore, the torques are complementarily operated and compositely shifted depending on the gear ratio of the fourth change gear train G4 and the gear ratio between the central drive gear CDG and the output gear OG, and are then transferred to the differential apparatus through the output shaft OS of the output gear OG, such that forward 4-speed driving is performed.

Although a case in which the first drive gear D1 and third input shaft IS3 are synchronously connected to each other through the sleeve SLE1 of the first synchronizer SL1 and the fourth drive gear D4 and the second input shaft IS2 are synchronously connected to each other through the sleeve SLE2 of the second synchronizer SL2 is described above, the first and second synchronizers SL1 and SL2 do not have influence on a shift, and may thus be maintained in a neutral state.

[Forward 5-Speed]

In forward 5-speed FD5, as shown in FIG. 2, the second drive gear D2 and the third input shaft IS3 are synchronously connected to each other through the sleeve SLE1 of the first synchronizer SL1, and the second clutch CL2 and the third clutch CL3 are operated.

Therefore, in a state in which the torque of the engine ENG is input to the planetary carrier PC of the composite transmission CT by the operation of the third clutch CL3, the torque is input to the sun gear S of the composite electronic CT through the second clutch CL2, the third input shaft IS3, the second drive gear D2, the second driven gear P2, the center shaft CS, the fourth driven gear P4, the fourth drive gear D4, and the transmitting shaft TMS by the operation of the second clutch CL2.

In this case, in the planetary gear set PG of the composite transmission CT, the torque of the engine is shifted by a combination of a revolution per minute (RPM) of the sun gear S and an RPM of the planetary carrier PC, and is then transferred to the differential apparatus through the ring gear R, the output gear OG and the output shaft OS, such that forward 5-speed driving is performed.

[Forward 6-Speed]

In forward 6-speed FD6, as shown in FIG. 2, the fourth drive gear D4 and the second input shaft IS2 are synchronously connected to each other through the sleeve SLE2 of the second synchronizer SL2, and the first clutch CL1 and the third clutch CL3 are operated.

Therefore, some of the torque of the engine ENG is input to the sun gear S of the composite transmission CT through the first clutch CL1, the second input shaft IS2, the fourth drive gear D4, and the transmitting shaft TMS in a reverse rotation direction by the operation of the first clutch CL1, and the other of the torque of the engine ENG is input to the planetary carrier PC of the composite transmission CT by the operation of the third clutch CL3.

In this case, in the planetary gear set PG of the composite transmission CT, the torque of the engine ENG is simultaneously input through the sun gear S and the planetary carrier PC, and the planetary gear set PG thus becomes a state in which it integrally rotates. Therefore, the input torque is transferred to the differential apparatus through the output gear OG and the output shaft OS as it is, such that forward 6-speed driving is performed.

[Forward 7-Speed]

In forward 7-speed FD7, as shown in FIG. 2, the first drive gear D1 and the third input shaft IS3 are synchronously connected to each other through the sleeve SLE1 of the first synchronizer SL1, and the second clutch CL2 and the third clutch CL3 are operated.

Therefore, some of the torque of the engine ENG is input to the sun gear S of the composite transmission CT through the second clutch CL2, the third input shaft IS3, the first drive gear D1, the first driven gear P1, the central shaft CS, the fourth driven gear P4, the fourth drive gear D4, and the transmitting shaft TMS by the operation of the second clutch CL2, and the other of the torque of the engine ENG is input to the planetary carrier PC of the composite transmission CT by the operation of the third clutch CL3.

In this case, in the planetary gear set PG of the composite transmission CT, the torque of the engine is shifted to be increased by a combination of an RPM of the sun gear S and an RPM of the planetary carrier PC, and is then transferred to the differential apparatus through the ring gear R, the output gear OG and the output shaft OS, such that forward 7-speed driving is performed.

[Forward 8-Speed]

In forward 8-speed FD8, as shown in FIG. 2, the third drive gear D3 and the second input shaft IS2 are synchronously connected to each other through the sleeve SLE2 of the second synchronizer SL2, and the first clutch CL1 and the third clutch CL3 are operated.

Therefore, some of the torque of the engine ENG is input to the sun gear S of the composite transmission CT through the first clutch CL1, the second input shaft IS2, the third drive gear D3, the idle gear IDG, the third driven gear P3, the central shaft CS, the fourth driven gear P4, the fourth drive gear D4, and the transmitting shaft TMS in the reverse rotation direction by the operation of the first clutch CL1, and the other of the torque of the engine ENG is input to the planetary carrier PC of the composite transmission CT by the operation of the third clutch CL3.

In this case, in the planetary gear set PG of the composite transmission CT, the torque is input to the planetary carrier PC in a state in which the sun gear S reversely rotates. Therefore, the torque is shifted to be further increased in the ring gear R, which is an output element, and is then transferred to the differential apparatus through the ring gear R, the output gear OG, and the output shaft OS, such that forward 8-speed driving, which is the highest shift stage, is performed.

Figure 3:
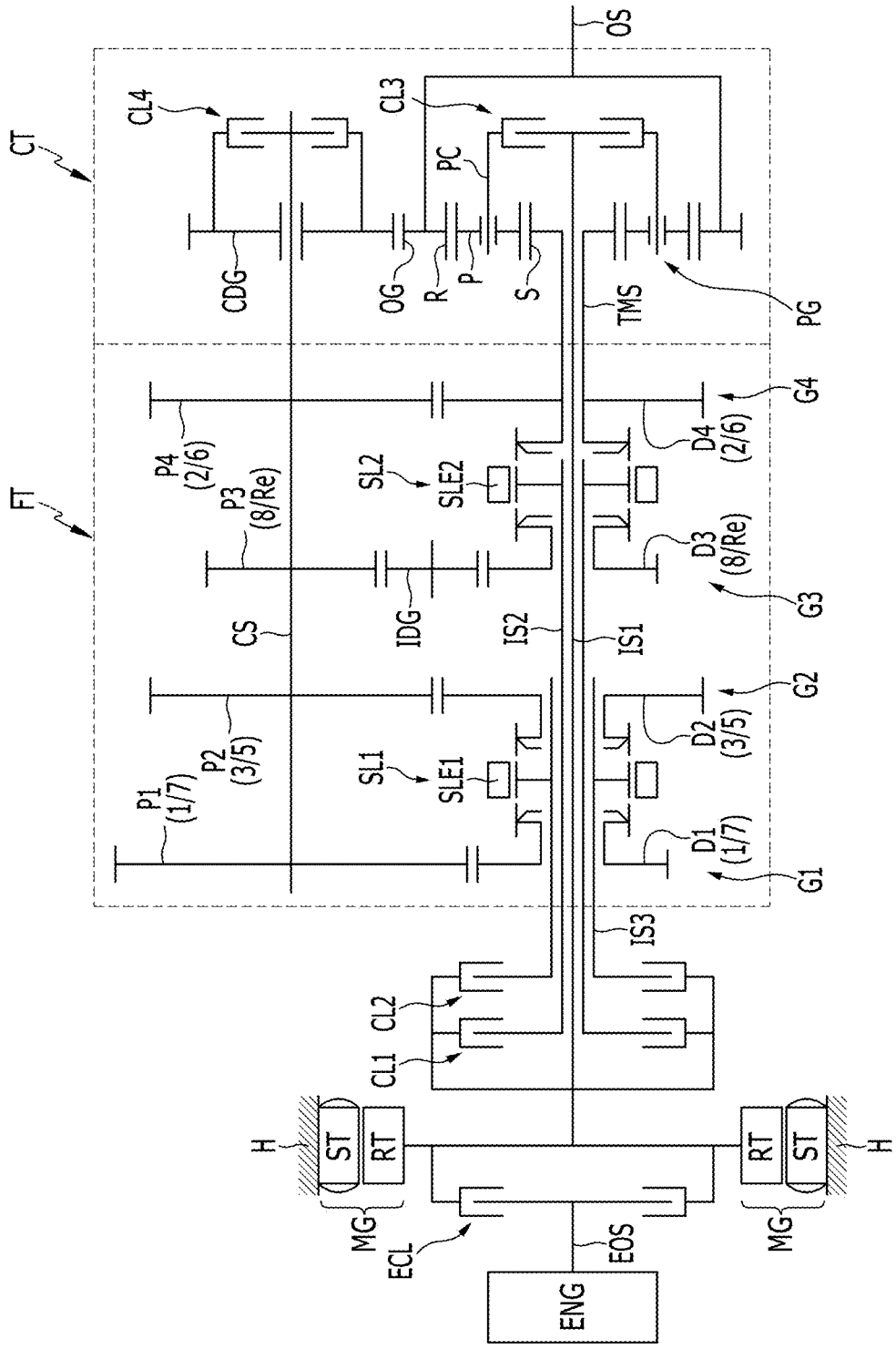
FIG. 3 is a configuration diagram of a power transmission apparatus for a vehicle according to a second embodiment of the present invention.

FIG. 3 is a configuration diagram of a power transmission apparatus for a vehicle according to a second embodiment of the present invention.

Referring to FIG. 3, in a second embodiment of the present invention, a motor/generator MG, which is an auxiliary power source, is additionally disposed to enable driving in a parallel hybrid mode and an electric vehicle (EV) mode, as compared with the first embodiment.

The motor/generator MG serves as a motor and a generator as known, and is configured to include a stator ST fixed to the transmission housing H and a rotor RT rotatably supported inside the stator ST in a radial direction.

The motor/generator MG is disposed behind the engine ENG, such that the rotor RT is selectively connected to the engine output shaft EOS with an engine clutch ECL interposed therebetween, is fixedly connected to the first input shaft IS1, and is selectively connected to the second and third input shafts IS2 and IS3 with first and second clutches CL1 and CL2 interposed therebetween, respectively.

Therefore, when a driver is to drive the vehicle by the torque of the engine ENG, the engine clutch ECL is controlled to be operated. In this case, the motor/generator MG performs a torque assist to enable the driving in the parallel hybrid mode.

In addition, when the driver is to drive the vehicle in the EV mode by a torque of the motor/generator MG, the vehicle may be driven by only the torque of the motor/generator MG in a state in which an operation of the engine clutch ECL is released.

FIG. 4 is a shift operation table of the power transmission apparatus for a vehicle according to a second embodiment of the present invention, and shift processes will be described with reference to FIG. 4.

Referring to FIG. 4, in a second embodiment of the present invention, the engine clutch ECL is operated in fixed shift stages of forward 1-speed FD1 to forward 8-speed FD8 and reverse 1-speed REV by driving of the engine ENG, such that the same shift processes as those of the first embodiment are performed, and a detailed description therefor will be omitted. In this case, torque assist driving by the motor/generator MG is enabled, such that the vehicle may be driven in the parallel hybrid mode.

In addition, in the EV mode, a power source is changed from the engine ENG into the motor/generator MG, but shift processes of forward 1-speed FD1 to forward 8-speed FD8 and reverse 1-speed REV are the same as those of the first embodiment, and a detailed description therefor will thus be omitted.

Figure 5:
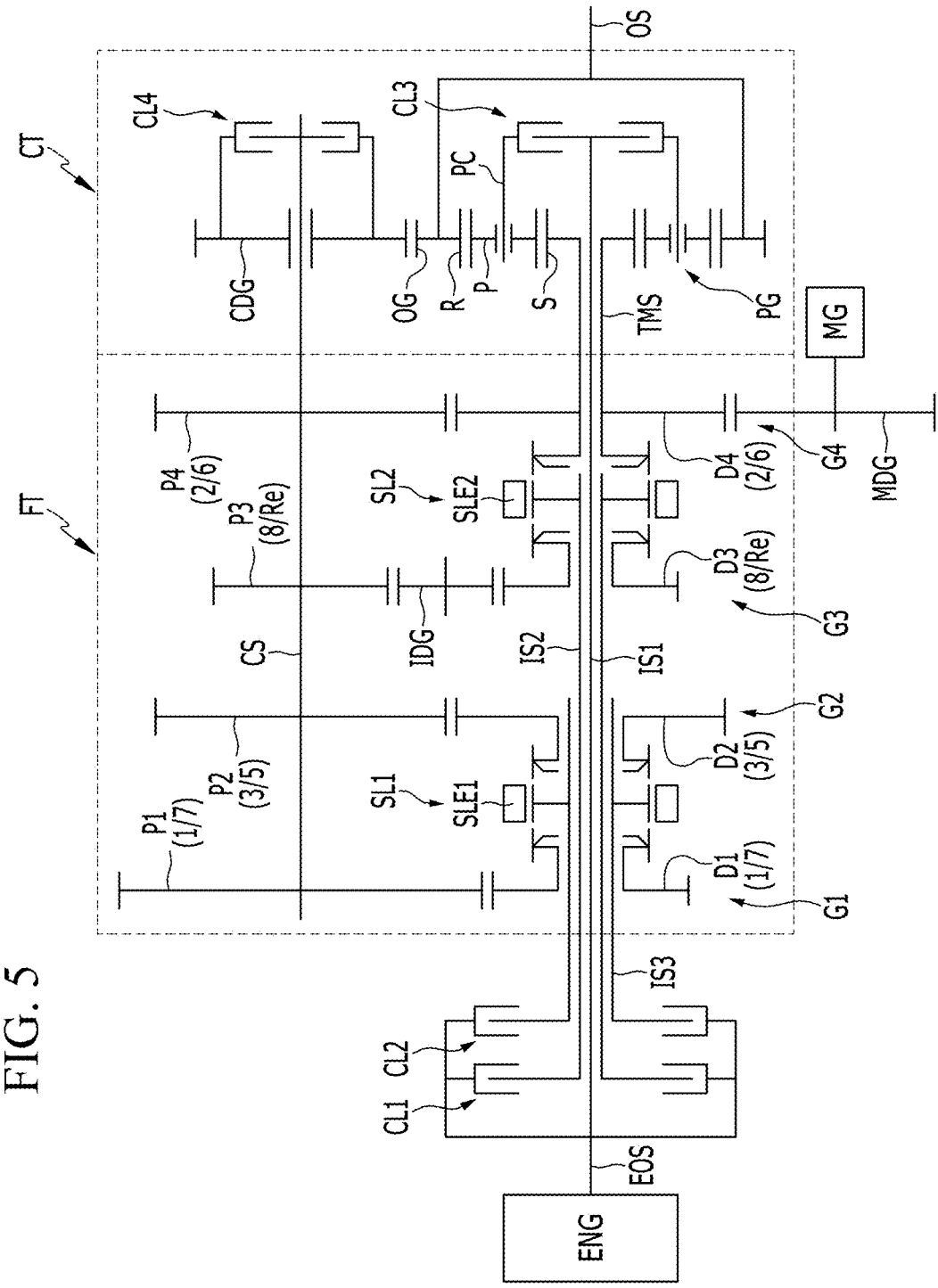
FIG. 5 is a configuration diagram of a power transmission apparatus for a vehicle according to a third embodiment of the present invention.

FIG. 5 is a configuration diagram of a power transmission apparatus for a vehicle according to a third embodiment of the present invention.

Referring to FIG. 5, in a third embodiment of the present invention, a motor/generator MG, which is an auxiliary power source, is additionally disposed to enable driving in a parallel hybrid mode, an EV mode, and an electronic continuously variable automatic transmission (e-CVT) mode, simultaneously with enabling driving by the torque of the engine ENG, as compared with the first embodiment.

The motor/generator MG serves as a motor and a generator as known, is disposed in parallel with the first input shaft IS1, and may be controlled to be operated as needed so that a motor drive gear MDG of the motor/generator MG is externally connected to the fourth drive gear D4 of the fourth change gear train G4, thereby driving the fourth drive gear D4.

Since all the components of the power transmission apparatus for a vehicle according to the third embodiment is the same as those of the power transmission apparatus for a vehicle according to the first embodiment except that the motor/generator MG is added, a detailed description for the components will be omitted.

Figure 6:
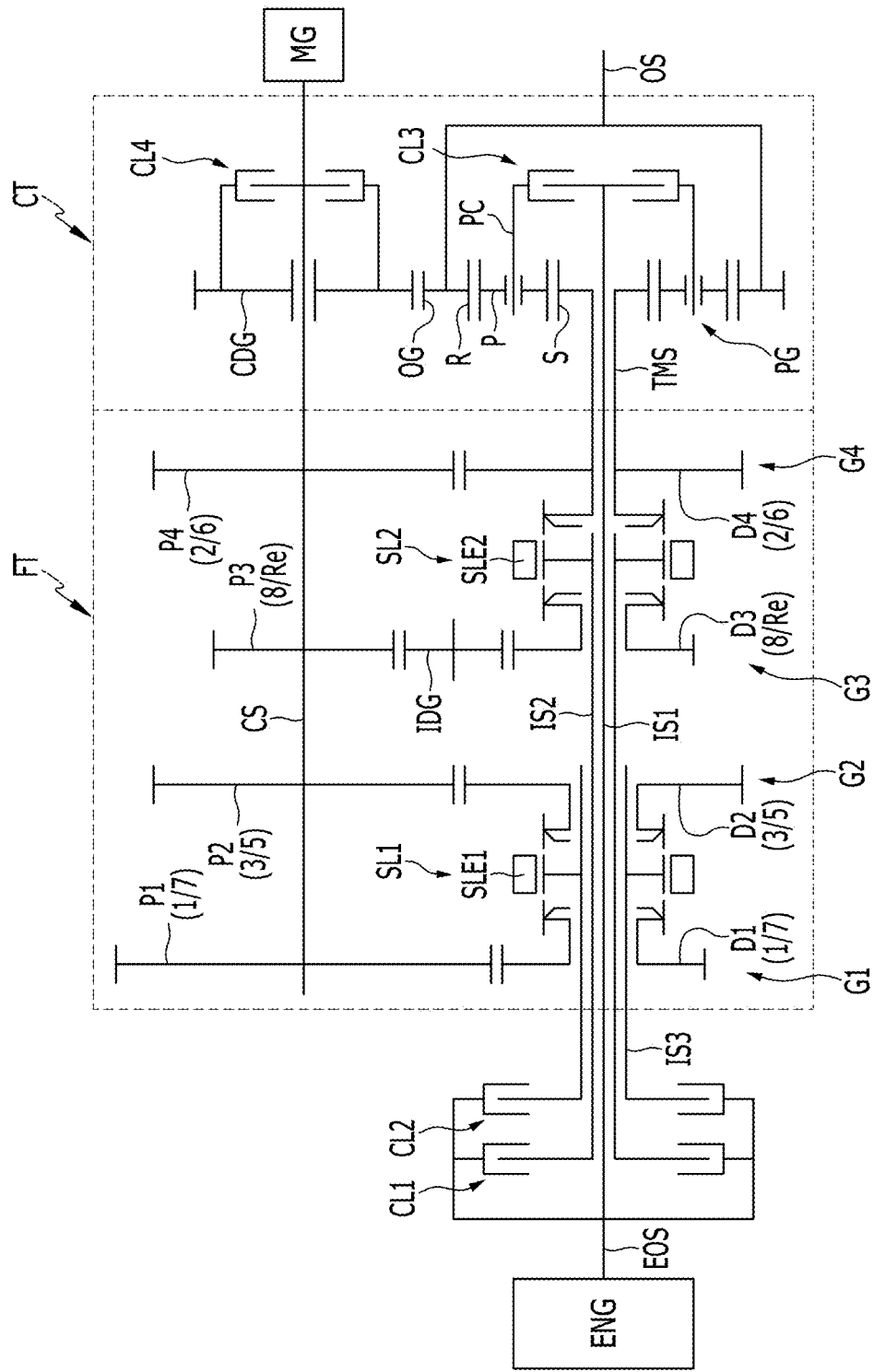
FIG. 6 is a configuration diagram of a power transmission apparatus for a vehicle according to a fourth embodiment of the present invention.

FIG. 6 is a configuration diagram of a power transmission apparatus for a vehicle according to a fourth embodiment of the present invention.

Referring to FIG. 6, in a fourth embodiment of the present invention, a motor/generator MG, which is an auxiliary power source, is additionally disposed to enable driving in a parallel hybrid mode, an EV mode, and an e-CVT mode, simultaneously with enabling driving by the torque of the engine ENG, as compared with the first embodiment.

The motor/generator MG serves as a motor and a generator as known, and is fixedly connected to the central shaft CS on the same shaft line as that of the central shaft CS. Therefore, the motor/generator MG may be controlled to be operated as needed, thereby driving the central shaft CS.

Since all the components of the power transmission apparatus for a vehicle according to the fourth embodiment are the same as those of the power transmission apparatus for a vehicle according to the first embodiment except that the motor/generator MG is added, a detailed description for the components will be omitted.

FIG. 7 is a shift operation table of the power transmission apparatuses for a vehicle according to third and fourth embodiments of the present invention, and shift processes will be described with reference to FIG. 7.

Referring to FIG. 7, shift processes in fixed shift stages of forward 1-speed FD1 to forward 8-speed FD8 and reverse 1-speed REV by driving of the engine ENG are the same as those of the first embodiment, and a description therefor will thus be omitted, and torque assist driving by the motor/generator MG in the shift processes by the driving of the engine ENG is enabled, such that the vehicle may be driven in the parallel hybrid mode.

In addition, in the EV mode, a power source is changed from the engine ENG into the motor/generator MG, and the fourth clutch CL4 is controlled to be operated, such that reverse (REV) driving and forward (FD) driving in the EV mode are enabled by forward rotation/reverse rotation of the motor/generator MG.

In addition, in the e-CVT mode, the third clutch CL3 is controlled to be operated in a state in which the first and second synchronizers SL1 and SL2 are put in a neutral position.

In this case, when the motor/generator MG is controlled to be operated in a state in which the first input shaft IS1 is connected to the planetary carrier PC through the third clutch CL3, such that the torque of the engine ENG is input, a torque assist of the engine ENG is enabled.

Figure 8:
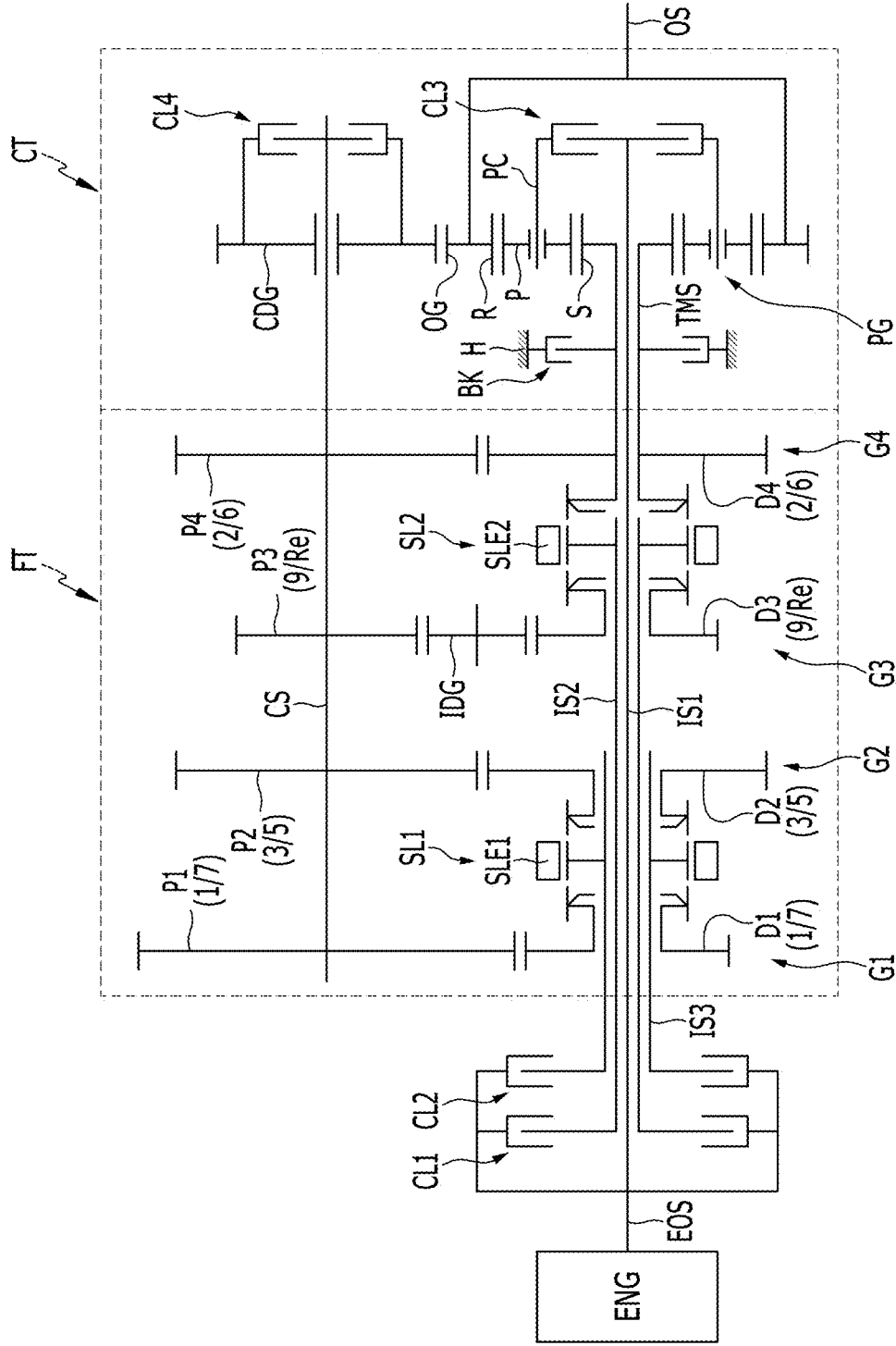
FIG. 8 is a configuration diagram of a power transmission apparatus for a vehicle according to a fifth embodiment of the present invention.

FIG. 8 is a configuration diagram of a power transmission apparatus for a vehicle according to a fifth embodiment of the present invention.

Referring to FIG. 8, in a fifth embodiment of the present invention, shift stages of forward 1-speed FD1 to forward 9-speed FD9 and reverse 1-speed REV may be implemented by selectively connecting the transmitting shaft TMS to the transmission housing H through a first brake B1, as compared with the first embodiment.

Therefore, in the power transmission apparatus for a vehicle according to a fifth embodiment of the present invention, the first brake B1 is added, and the third driver gear D3 is changed from a forward 8-speed and reverse drive gear 8/Re into a forward 9-speed and reverse drive gear 9/Re, as compared with the first embodiment.

FIG. 9 is a shift operation table of the power transmission apparatus for a vehicle according to a fifth embodiment of the present invention, and shift processes will be described with reference to FIG. 9.

[Reverse]

In a reverse shift stage (REV), as shown in FIG. 9, the third drive gear D3 and the second input shaft IS2 are synchronously connected to each other through the sleeve SLE2 of the second synchronizer SL2, and the first clutch CL1 and the fourth clutch CL4 are operated.

Therefore, the torque of the engine ENG is transferred to a differential apparatus through the first clutch CL1, the second input shaft IS2, the third drive gear D3, the idle gear IDG, the third driven gear P3, the central shaft CS, the fourth clutch CL4, the central drive gear CDG, the output gear OG, and the output shaft OS by the operation of the first clutch CL1, such that reverse driving is performed.

In this case, the composite transmission CT does not have influence on a reverse shift.

[Forward 1-Speed]

In forward 1-speed FD1, as shown in FIG. 9, the first drive gear D1 and third input shaft IS3 are synchronously connected to each other through the sleeve SLE1 of the first synchronizer SL1, and the second clutch CL2 and the fourth clutch CL4 are operated.

Therefore, the torque of the engine ENG is transferred to the differential apparatus through the second clutch CL2, the third input shaft IS3, the first drive gear D1, the first driven gear P1, the central shaft CS, the fourth clutch CL4, the central drive gear CDG, the output gear OG, and the output shaft OS by the operation of the second clutch CL2, such that forward 1-speed driving is performed.

In this case, the composite transmission CT does not perform any operation on a forward 1-speed shift.

[Forward 2-Speed]

In forward 2-speed FD2, as shown in FIG. 9, the fourth drive gear D4 and the second input shaft IS2 are synchronously connected to each other through the sleeve SLE2 of the second synchronizer SL2, and the first clutch CL1 and the fourth clutch CL4 are operated.

Therefore, the torque of the engine ENG is transferred to the differential apparatus through the first clutch CL1, the second input shaft IS2, the fourth drive gear D4, the fourth driven gear P4, the central shaft CS, the fourth clutch CL4, the central drive gear CDG, the output gear OG, and the output shaft OS by the operation of the first clutch CL1, such that forward 2-speed driving is performed.

In this case, the composite transmission CT does not perform any operation on a forward 2-speed shift.

[Forward 3-Speed]

In forward 3-speed FD3, as shown in FIG. 9, the second driven gear P2 and the third input shaft IS3 are synchronously connected to each other through the sleeve SLE1 of the first synchronizer SL1, and the second clutch CL2 and the fourth clutch CL4 are operated.

Therefore, the torque of the engine ENG is transferred to the differential apparatus through the second clutch CL2, the third input shaft IS3, the second drive gear D2, the second driven gear P2, the central shaft CS, the fourth clutch CL4, the central drive gear CDG, the output gear OG, and the output shaft OS by the operation of the second clutch CL2, such that forward 3-speed driving is performed.

[Forward 4-Speed]

In forward 4-speed FD4, as shown in FIG. 9, the first drive gear D1 and third input shaft IS3 are synchronously connected to each other through the sleeve SLE1 of the first synchronizer SL1, the fourth drive gear D4 and the second input shaft IS2 are synchronously connected to each other through the sleeve SLE2 of the second synchronizer SL2, and the third clutch CL3 and the fourth clutch CL4 are operated.

Therefore, the fourth clutch CL4 is controlled to be operated in a state in which the torque of the engine ENG is input through the planetary carrier PC by the operation control of the third clutch CL3.

In this case, the planetary gear set PG, the fourth change gear train G4, and the central shaft CS form one power transfer path having a closed-circuit form, such that the torque is input through the planetary carrier PC of the planetary gear set PG. Therefore, the torques are complementarily operated and compositely shifted depending on the gear ratio of the fourth change gear train G4 and the gear ratio between the central drive gear CDG and the output gear OG, and are then transferred to the differential apparatus through the output shaft Os of the output gear OG, such that forward 4-speed driving is performed.

Although a case in which the first drive gear D1 and third input shaft IS3 are synchronously connected to each other through the sleeve SLE1 of the first synchronizer SL1 and the fourth drive gear D4 and the second input shaft IS2 are synchronously connected to each other through the sleeve SLE2 of the second synchronizer SL2 is described above, the first and second synchronizers SL1 and SL2 do not have influence on a shift, and may thus be maintained in a neutral state.

[Forward 5-Speed]

In forward 5-speed FD5, as shown in FIG. 9, the second drive gear D2 and the third input shaft IS3 are synchronously connected to each other through the sleeve SLE1 of the first synchronizer SL1, and the second clutch CL2 and the third clutch CL3 are operated.

Therefore, in a state in which the torque of the engine ENG is input to the planetary carrier PC of the composite transmission CT by the operation of the third clutch CL3, the torque is input to the sun gear S of the composite electronic CT through the second clutch CL2, the third input shaft IS3, the second drive gear D2, the second driven gear P2, the center shaft CS, the fourth driven gear P4, the fourth drive gear D4, and the transmitting shaft TMS by the operation of the second clutch CL2.

In this case, in the planetary gear set PG of the composite transmission CT, the torque of the engine is shifted by a combination of an RPM of the sun gear S and an RPM of the planetary carrier PC, and is then transferred to the differential apparatus through the ring gear R, the output gear OG and the output shaft OS, such that forward 5-speed driving is performed.

[Forward 6-Speed]

In forward 6-speed FD6, as shown in FIG. 9, the fourth drive gear D4 and the second input shaft IS2 are synchronously connected to each other through the sleeve SLE2 of the second synchronizer SL2, and the first clutch CL1 and the third clutch CL3 are operated.

Therefore, some of the torque of the engine ENG is input to the sun gear S of the composite transmission CT through the first clutch CL1, the second input shaft IS2, the fourth drive gear D4, and the transmitting shaft TMS in a reverse rotation direction by the operation of the first clutch CL1, and the other of the torque of the engine ENG is input to the planetary carrier PC of the composite transmission CT by the operation of the third clutch CL3.

In this case, in the planetary gear set PG of the composite transmission CT, the torque of the engine ENG is simultaneously input through the sun gear S and the planetary carrier PC, and the planetary gear set PG thus becomes a state in which it integrally rotates. Therefore, the input torque is transferred to the differential apparatus through the output gear OG and the output shaft OS as it is, such that forward 6-speed driving is performed.

[Forward 7-Speed]

In forward 7-speed FD7, as shown in FIG. 9, the first drive gear D1 and the third input shaft IS3 are synchronously connected to each other through the sleeve SLE1 of the first synchronizer SL1, and the second clutch CL2 and the third clutch CL3 are operated.

Therefore, some of the torque of the engine ENG is input to the sun gear S of the composite transmission CT through the second clutch CL2, the third input shaft IS3, the first drive gear D1, the first driven gear P1, the central shaft CS, the fourth driven gear P4, the fourth drive gear D4, and the transmitting shaft TMS by the operation of the second clutch CL2, and the other of the torque of the engine ENG is input to the planetary carrier PC of the composite transmission CT by the operation of the third clutch CL3.

In this case, in the planetary gear set PG of the composite transmission CT, the torque of the engine is shifted to be increased by a combination of an RPM of the sun gear S and an RPM of the planetary carrier PC, and is then transferred to the differential apparatus through the ring gear R, the output gear OG and the output shaft OS, such that forward 7-speed driving is performed.

[Forward 8-Speed]

In forward 8-speed FD8, as shown in FIG. 9, the third clutch CL3 and the brake BK are operated in a state in which the first and second synchronizers SL1 and SL2 are put in a neutral position.

Therefore, in a state in which the torque of the engine ENG is input to the planetary carrier PC of the composite transmission CT by the operation of the third clutch CL3, the sun gear S of the composite transmission CT is operated as a fixed element by the operation of the brake BK.

In this case, in the planetary gear set PG of the composite transmission CT, the torque is input to the planetary carrier PC in a state in which the sun gear S is operated as the fixed element. Therefore, the torque is shifted to be increased in the ring gear R, which is an output element, and is then transferred to the differential apparatus through the ring gear R, the output gear OG, and the output shaft OS, such that forward 8-speed driving is performed.

[Forward 9-Speed]

In forward 9-speed FD9, as shown in FIG. 9, the third drive gear D4 and the second input shaft IS2 are synchronously connected to each other through the sleeve SLE2 of the second synchronizer SL2, and the first clutch CL1 and the third clutch CL3 are operated.

Therefore, some of the torque of the engine ENG is input to the sun gear S of the composite transmission CT through the first clutch CL1, the second input shaft IS2, the third drive gear D3, the idle gear IDG, the third driven gear P3, the central shaft CS, the fourth driven gear P4, the fourth drive gear D4, and the transmitting shaft TMS in the reverse rotation direction by the operation of the first clutch CL1, and the other of the torque of the engine ENG is input to the planetary carrier PC of the composite transmission CT by the operation of the third clutch CL3.

In this case, in the planetary gear set PG of the composite transmission CT, the torque is input to the planetary carrier PC in a state in which the sun gear S reversely rotates. Therefore, the torque is shifted to be further increased in the ring gear R, which is an output element, and is then transferred to the differential apparatus through the ring gear R, the output gear OG, and the output shaft OS, such that forward 9-speed driving, which is the highest shift stage, is performed.

In the power transmission apparatus for a vehicle according to the fifth embodiment of the present invention as described above, shifts of forward 1-speed FD1 to forward 7-speed FD7 and reverse 1-speed REV are the same as those of the first embodiment, and a new shift process of forward 8-speed FD8 is added, such that forward 8-speed FD8 of the first embodiment is changed into forward 9-speed FD9, thereby making it possible to implement shift stages of forward 1-speed FD1 to forward 9-speed F9 and reverse 1-speed REV.

Figure 10:
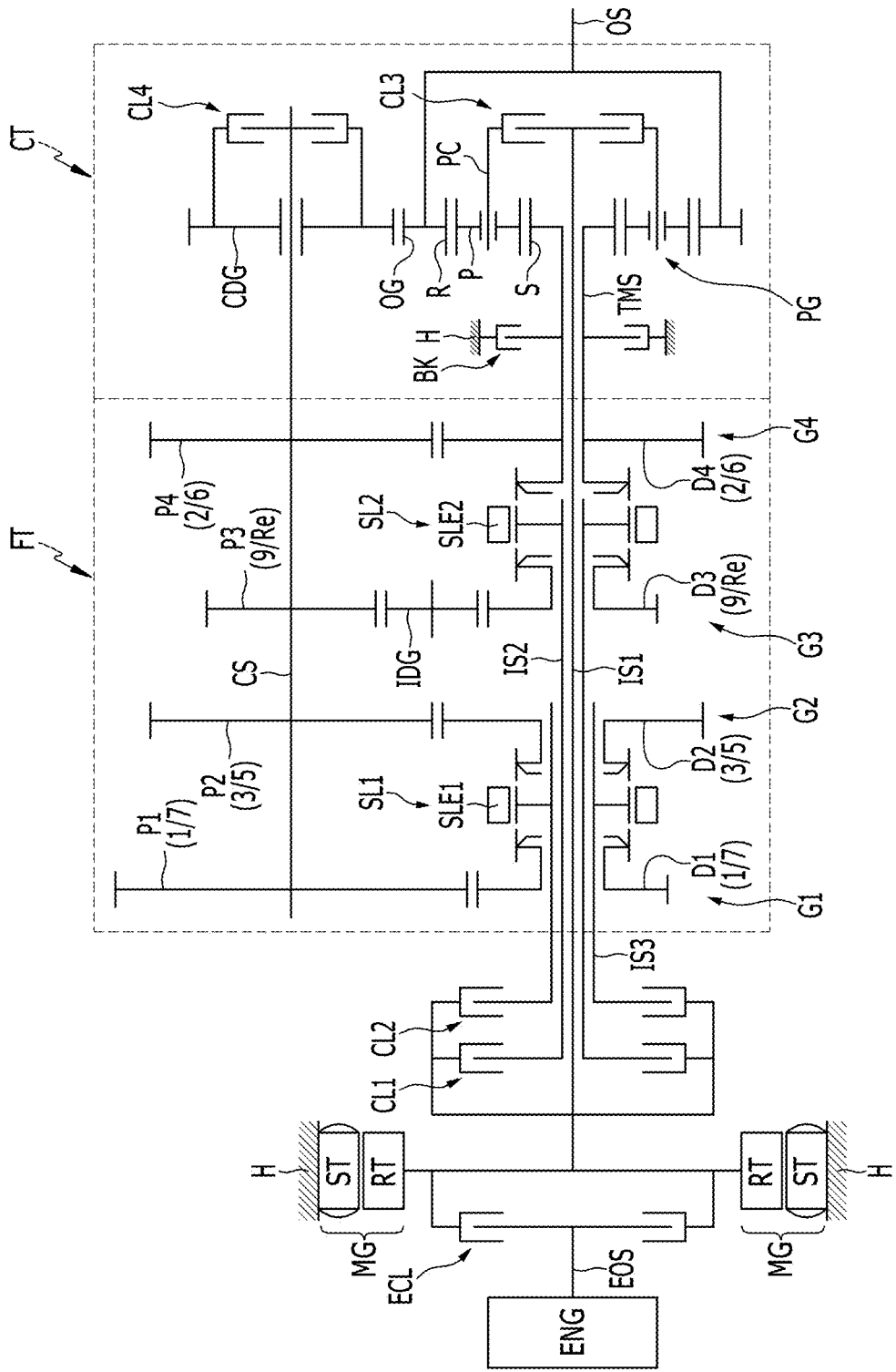
FIG. 10 is a configuration diagram of a power transmission apparatus for a vehicle according to a sixth embodiment of the present invention.

FIG. 10 is a configuration diagram of a power transmission apparatus for a vehicle according to a sixth embodiment of the present invention.

Referring to FIG. 10, in a sixth embodiment of the present invention, a motor/generator MG, which is an auxiliary power source, is additionally disposed to enable driving in a parallel hybrid mode and an EV mode, as compared with the fifth embodiment.

The motor/generator MG serves as a motor and a generator as known, and is configured to include a stator ST fixed to the transmission housing H and a rotor RT rotatably supported inside the stator ST in a radial direction.

The motor/generator MG is disposed behind the engine ENG, such that the rotor RT is selectively connected to the engine output shaft EOS with an engine clutch ECL interposed therebetween, is fixedly connected to the first input shaft IS1, and is selectively connected to the second and third input shafts IS2 and IS3 with first and second clutches CL1 and CL2 interposed therebetween, respectively.

Therefore, when a driver is to drive the vehicle by the torque of the engine ENG, the engine clutch ECL is controlled to be operated. In this case, the motor/generator MG performs a torque assist to enable the driving in the parallel hybrid mode.

In addition, when the driver is to drive the vehicle in the EV mode by a torque of the motor/generator MG, the vehicle may be driven by only the torque of the motor/generator MG in a state in which an operation of the engine clutch ECL is released.

FIG. 11 is a shift operation table of the power transmission apparatus for a vehicle according to a sixth embodiment of the present invention, and shift processes will be described with reference to FIG. 11.

Referring to FIG. 11, in a sixth embodiment of the present invention, the engine clutch ECL is operated in fixed shift stages of forward 1-speed FD1 to forward 9-speed FD9 and reverse 1-speed REV by driving of the engine ENG, such that the same shift processes as those of the fifth embodiment are performed, and a detailed description therefor will be omitted. In this case, torque assist driving by the motor/generator MG is enabled, such that the vehicle may be driven in the parallel hybrid mode.

In addition, in the EV mode, a power source is changed from the engine ENG into the motor/generator MG, but shift processes of forward 1-speed FD1 to forward 9-speed FD9 and reverse 1-speed REV are the same as those of the fifth embodiment, and a detailed description therefor will thus be omitted.

Figure 12:
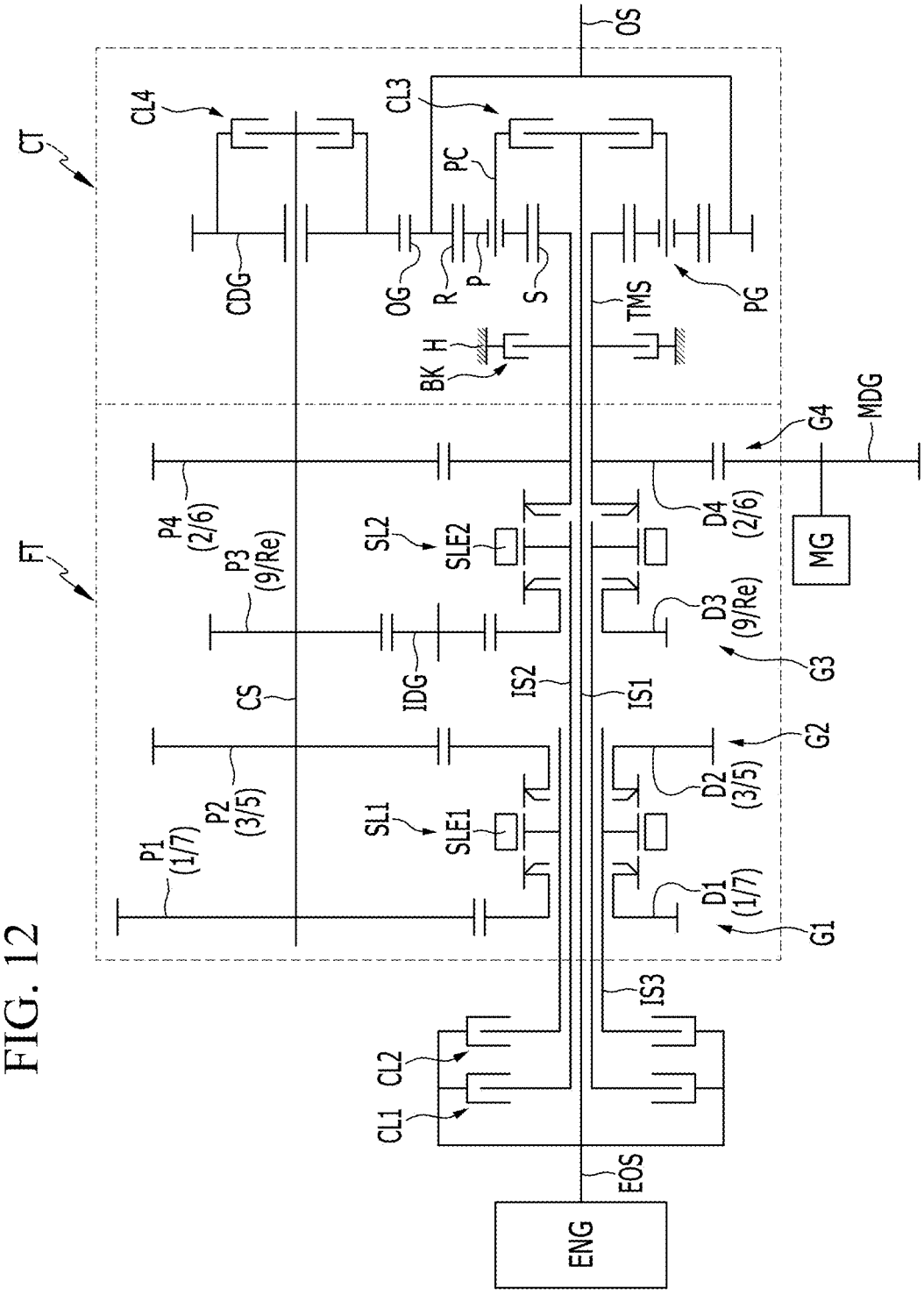
FIG. 12 is a configuration diagram of a power transmission apparatus for a vehicle according to a seventh embodiment of the present invention.

FIG. 12 is a configuration diagram of a power transmission apparatus for a vehicle according to a seventh embodiment of the present invention.

Referring to FIG. 12, in a seventh embodiment of the present invention, a motor/generator MG, which is an auxiliary power source, is additionally disposed to enable driving in a parallel hybrid mode, an EV mode, and an e-CVT mode, simultaneously with enabling driving by the torque of the engine ENG, as compared with the fifth embodiment.

The motor/generator MG serves as a motor and a generator as known, is disposed in parallel with the first input shaft IS1, and may be controlled to be operated as needed so that a motor drive gear MDG of the motor/generator MG is externally connected to the fourth drive gear D4 of the fourth change gear train G4, thereby driving the fourth drive gear D4.

Since all the components of the power transmission apparatus for a vehicle according to the seventh embodiment is the same as those of the power transmission apparatus for a vehicle according to the fifth embodiment except that the motor/generator MG is added, a detailed description for the components will be omitted.

Figure 13:
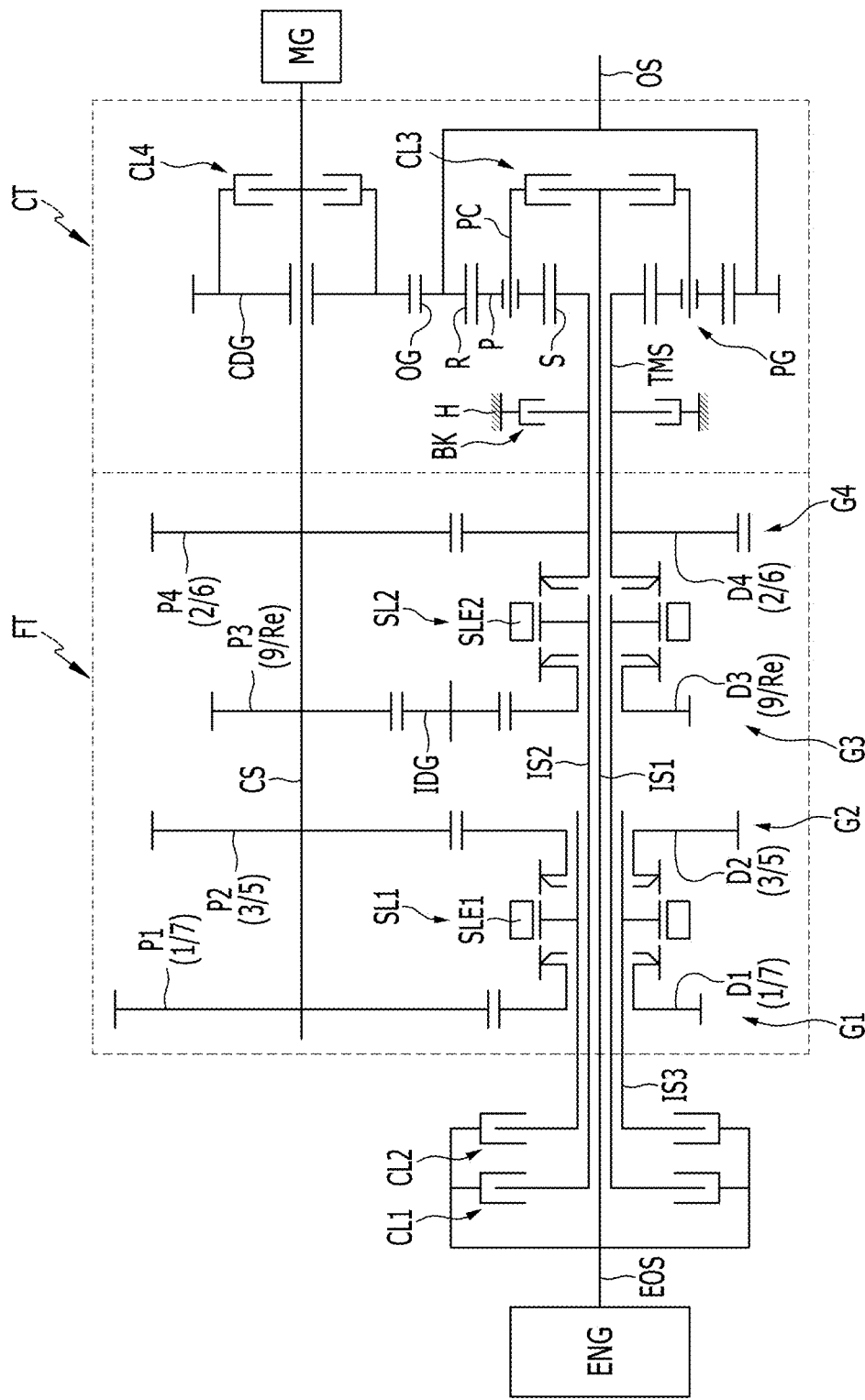
FIG. 13 is a configuration diagram of a power transmission apparatus for a vehicle according to an eighth embodiment of the present invention.

FIG. 13 is a configuration diagram of a power transmission apparatus for a vehicle according to an eighth embodiment of the present invention.

Referring to FIG. 13, in an eighth embodiment of the present invention, a motor/generator MG, which is an auxiliary power source, is additionally disposed to enable driving in a parallel hybrid mode, an EV mode, and an e-CVT mode, simultaneously with enabling driving by the torque of the engine ENG, as compared with the fifth embodiment.

The motor/generator MG serves as a motor and a generator as known, and is fixedly connected to the central shaft CS on the same shaft line as that of the central shaft CS. Therefore, the motor/generator MG may be controlled to be operated as needed, thereby driving the central shaft CS.

Since all the components of the power transmission apparatus for a vehicle according to the eighth embodiment are the same as those of the power transmission apparatus for a vehicle according to the fifth embodiment except that the motor/generator MG is added, a detailed description for the components will be omitted.

FIG. 14 is a shift operation table of the power transmission apparatuses for a vehicle according to seventh and eighth embodiments of the present invention, and shift processes will be described with reference to FIG. 14.

Referring to FIG. 14, shift processes in fixed shift stages of forward 1-speed FD1 to forward 9-speed FD9 and reverse 1-speed REV by driving of the engine ENG are the same as those of the fifth embodiment, and a description therefor will thus be omitted, and torque assist driving by the motor/generator MG in the shift processes by the driving of the engine ENG is enabled, such that the vehicle may be driven in the parallel hybrid mode.

In addition, in the EV mode, a power source is changed from the engine ENG into the motor/generator MG, and the fourth clutch CL4 is controlled to be operated, such that reverse (REV) driving and forward (FD) driving in the EV mode are enabled by forward rotation/reverse rotation of the motor/generator MG.

In addition, in the e-CVT mode, the third clutch CL3 is controlled to be operated in a state in which the first and second synchronizers SL1 and SL2 are put in a neutral position.

In this case, when the motor/generator MG is controlled to be operated in a state in which the torque of the engine ENG is input to the planetary carrier PC through the third clutch CL3 and the first input shaft IS1, a torque assist of the engine ENG is enabled.

As described above, in the power transmission apparatus for a vehicle according to a first embodiment of the present invention, the fixed shift stages of forward eight speeds and reverse one speed may be implemented using one planetary gear set PG in a DCT structure that uses two synchronizers SL1 and SL to realize more shift stages while simplifying an internal configuration and minimize a weight to improve mountability and fuel consumption.

In addition, in the power transmission apparatus for a vehicle according to a second embodiment of the present invention, as compared with the first embodiment, one motor/generator MG is disposed in series with the engine ENG behind the engine ENG to enable the driving in the engine mode, the parallel hybrid mode, and the EV mode in multiple fixed shift stages, thereby making it possible to improve fuel consumption.

In addition, in the power transmission apparatus for a vehicle according to a third embodiment of the present invention, as compared with the first embodiment, one motor/generator MG is disposed in parallel with the first input shaft IS1, and the torque of the motor/generator MG is transferred to the central shaft CS to enable the driving in the engine mode and the parallel hybrid mode in multiple fixed shift stages and enable the driving in the e-CVT mode and the EV mode as needed, thereby making it possible to improve fuel consumption.

In addition, in the power transmission apparatus for a vehicle according to a fourth embodiment of the present invention, as compared with the first embodiment, one motor/generator MG is fixedly connected to the central shaft CS on the same shaft line as that of the central shaft CS to allow the torque of the motor/generator MG to be transferred to the central shaft CS to enable the driving in the engine mode and the parallel hybrid mode in multiple fixed shift stages and enable the driving in the e-CVT mode and the EV mode as needed, thereby making it possible to improve fuel consumption.

In addition, in the power transmission apparatus for a vehicle according to a fifth embodiment of the present invention, one planetary gear set PG is added to the DCT structure that uses two synchronizers SL1 and SL to allow the sun gear S of the planetary gear set PG to be operated as a selective fixed element as compared with the first embodiment that may implement the fixed shift stages of forward eight speeds and reverse one speed, such that the fixed shift stages of forward nine speeds and reverse one speed may be implemented to realize more shift stages while simplifying an internal configuration and minimize a weight to improve mountability and fuel consumption.

In addition, in the power transmission apparatus for a vehicle according to a sixth embodiment of the present invention, as compared with the fifth embodiment, one motor/generator MG is disposed in series with the engine ENG behind the engine ENG to enable the driving in the engine mode, the parallel hybrid mode, and the EV mode in multiple fixed shift stages, thereby making it possible to improve fuel consumption.

In addition, in the power transmission apparatus for a vehicle according to a seventh embodiment of the present invention, as compared with the fifth embodiment, one motor/generator MG is disposed in parallel with the first input shaft IS1, and the torque of the motor/generator MG is transferred to the central shaft CS to enable the driving in the engine mode and the parallel hybrid mode in multiple fixed shift stages and enable the driving in the e-CVT mode and the EV mode as needed, thereby making it possible to improve fuel consumption.

In addition, in the power transmission apparatus for a vehicle according to an eighth embodiment of the present invention, as compared with the fifth embodiment, one motor/generator MG is fixedly connected to the central shaft CS on the same shaft line as that of the central shaft CS to allow the torque of the motor/generator MG to be transferred to the central shaft CS to enable the driving in the engine mode and the parallel hybrid mode in multiple fixed shift stages and enable the driving in the e-CVT mode and the EV mode as needed, thereby making it possible to improve fuel consumption.

In addition, in all the embodiments of the present invention, when a shift is performed, three clutches CL1, CL2, and CL alternately perform the shifts to odd shift stages and even shift stages, thereby making it possible to natural perform the shift without generating a shift disconnection sense.

While this invention has been described in connection with embodiments, it is to be understood that the invention is not limited to the disclosed embodiments, but, on the contrary, is intended to cover various modifications and equivalent arrangements included within the spirit and scope of the claims.

DESCRIPTION OF SYMBOLS

IS1,IS2,IS3 . . . first, second, third input shaft
CS . . . central shaft
CDG . . . central drive gear
CL1,CL2,CL3,CL4 . . . first, second, third, fourth clutch
FT . . . fixed transmission
CT . . . composite transmission
D1,D2,D3,D4 . . . first, second, third, fourth drive gear
P1,P2,P3,P4 . . . first, second, third, fourth driven gear
G1,G2,G3,G4 . . . first, second, third, fourth change gear train
EOS . . . engine output shaft(crankshaft)

IDG . . . idle gear
BK . . . brake
OS . . . output shaft
OG . . . output gear
PG . . . planetary gear set
SL1, SL2 . . . first, second synchronizer
TMS . . . transmitting shaft
MG . . . motor/generator

What is claimed is:

1. A power transmission apparatus for a vehicle, comprising:
    a first input shaft fixedly connected to an engine output shaft;
    a second input shaft formed of a hollow shaft, disposed on an outer circumference of the first input shaft without rotation interference to overlap the first input shaft, and selectively connected to the engine output shaft through a first clutch;
    a third input shaft formed of a hollow shaft, disposed on an outer circumference of the second input shaft without rotation interference to overlap the second input shaft, and selectively connected to the engine output shaft through a second clutch;
    a transmitting shaft disposed on the outer circumference of the first input shaft without rotation interference to correspond to a rear side of the second input shaft;
    a central shaft disposed in parallel with the first input shaft by a predetermined interval;
    a fixed transmission selectively shifting an input torque depending on the respective gear ratios of four change gear trains disposed between the first and second input shafts, the transmitting shaft, and the central shaft and each having drive gears and driven gears externally connected to each other and outputting the shifted torque through the central shaft and the transmitting shaft;
    a composite transmission including a planetary gear set having a sun gear fixedly connected to the transmitting shaft, a planetary carrier selectively connected to the first input shaft through a third clutch, and a ring gear connected integrally with an output gear to be selectively connected to the central shaft to output the shifted torque; and
    an output shaft fixedly connected to the output gear of the composite transmission.

2. The power transmission apparatus for a vehicle of claim 1, wherein:
    the first and second clutches, the fixed transmission, and the composite transmission
    are disposed in a sequence of the first and second clutches, the fixed transmission, and the composite transmission behind the engine.

3. The power transmission apparatus for a vehicle of claim 1, wherein:
    the four change gear trains include:
    a first change gear train including a first drive gear disposed on an outer circumference of the third input shaft without rotation interference and a first driven gear fixedly connected to the central shaft and externally connected to the first drive gear;
    a second change gear train including a second drive gear disposed on the outer circumference of the third input shaft without rotation interference and a second driven gear fixedly connected to the central shaft and externally connected to the second drive gear;
    a third change gear train including a third drive gear disposed on the outer circumference of the second input shaft without rotation interference, a third driven gear fixedly connected to the central shaft, and an idle gear externally connected to the third drive gear and the third driven gear; and
    a first change gear train including a fourth drive gear fixedly connected to the transmitting shaft and a fourth driven gear fixedly connected to the central shaft and externally connected to the fourth drive gear.

4. The power transmission apparatus for a vehicle of claim 3, wherein:
    the first drive gear and the second drive gear are selectively synchronously connected to the third input shaft by a first synchronizer, and
    the third drive gear and the fourth drive gear are selectively synchronously connected to the second input shaft by a second synchronizer.

5. The power transmission apparatus for a vehicle of claim 3, wherein:
    the first change gear train has a gear ratio for forward 1-speed and 7-speed,
    the second change gear train has a gear ratio for forward 3-speed and 5-speed,
    the third change gear train has a gear ratio for forward 8-speed and reverse, and
    the fourth change gear train has a gear ratio for forward 2-speed and 6-speed.

6. The power transmission apparatus for a vehicle of claim 1, wherein:
    in the composite transmission,
    the sun gear of the planetary gear set is fixedly connected to the transmitting shaft, the planetary carrier of the planetary gear set is selectively connected to the first input shaft, and the ring gear of the planetary gear set is fixedly connected to the output gear connected to the output shaft, and
    the output gear is externally connected to a central drive gear disposed on the central shaft without rotation interference and selectively connected to the central shaft through a fourth clutch.

7. The power transmission apparatus for a vehicle of claim 6, wherein:
    the composite transmission
    outputs a torque selectively transferred through the central drive gear on the central shaft to the output shaft through the output gear formed integrally with the ring gear as it is, and
    complementarily compositely shifts a torque selectively input from the first input shaft to the planetary carrier and the torque shifted from the fixed transmission and input to the sun gear through the transmitting shaft and outputs the shifted torque to the output shaft through the output gear.

8. The power transmission apparatus for a vehicle of claim 6, wherein:
    the planetary gear set is a single pinion planetary gear set.

9. The power transmission apparatus for a vehicle of claim 1, further comprising:
    a motor/generator connected to the first input shaft in series, selectively connected to the engine output shaft through an engine clutch, and selectively connected to the second and third input shafts through the first and second clutches, respectively.

10. The power transmission apparatus for a vehicle of claim 1, further comprising:

a motor/generator disposed in parallel with the first input shaft and having a motor drive gear externally connected to a drive gear fixedly connected to the transmitting shaft.

11. The power transmission apparatus for a vehicle of claim 1, further comprising:
a motor/generator disposed on the same shaft line as that of the central shaft and fixedly connected to the central shaft.

12. The power transmission apparatus for a vehicle of claim 1, wherein:
the transmitting shaft is selectively connected to a transmission housing through a brake.

13. The power transmission apparatus for a vehicle of claim 12, wherein:
the first change gear train has a gear ratio for forward 1-speed and 7-speed,
the second change gear train has a gear ratio for forward 3-speed and 5-speed,
the third change gear train has a gear ratio for forward 9-speed and reverse, and
the fourth change gear train has a gear ratio for forward 2-speed and 6-speed.

14. The power transmission apparatus for a vehicle of claim 12, further comprising:
a motor/generator connected to the first input shaft in series, selectively connected to the engine output shaft through an engine clutch, and selectively connected to the second and third input shafts through the first and second clutches, respectively.

15. The power transmission apparatus for a vehicle of claim 12, further comprising:
a motor/generator disposed in parallel with the first input shaft and having a motor drive gear externally connected to a drive gear fixedly connected to the transmitting shaft.

16. The power transmission apparatus for a vehicle of claim 12, further comprising:
a motor/generator disposed on the same shaft line as that of the central shaft and fixedly connected to the central shaft.

* * * * *